Nov. 15, 1955         G. H. HERRICK         2,724,067
AXIAL AIR GAP GENERATOR

Filed Aug. 20, 1951         4 Sheets-Sheet 1

INVENTOR.
George H. Herrick
BY
Paul L. Krohn
Atty.

Nov. 15, 1955   G. H. HERRICK   2,724,067
AXIAL AIR GAP GENERATOR
Filed Aug. 20, 1951   4 Sheets-Sheet 2

INVENTOR.
George H. Herrick
BY
Paul L. Kesler
Atty.

Nov. 15, 1955 G. H. HERRICK 2,724,067
AXIAL AIR GAP GENERATOR
Filed Aug. 20, 1951 4 Sheets-Sheet 3
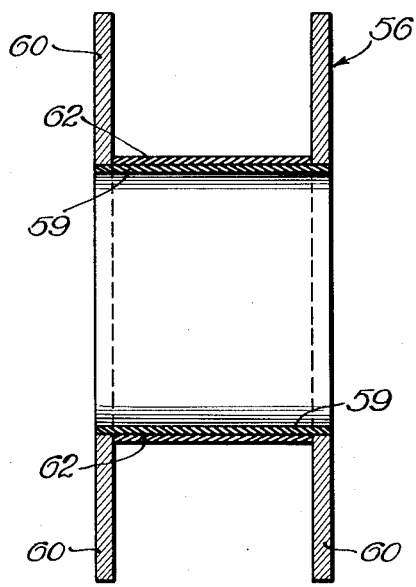
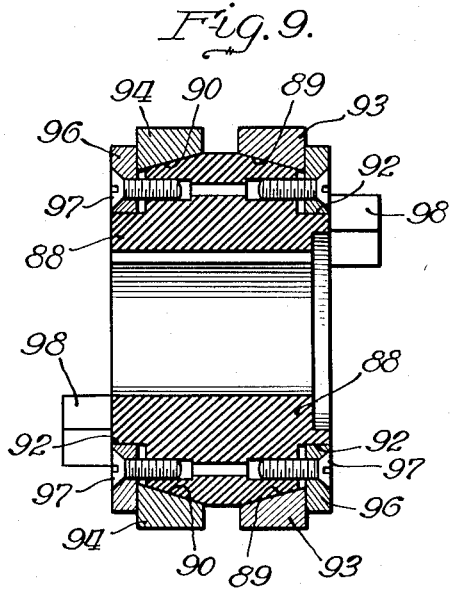
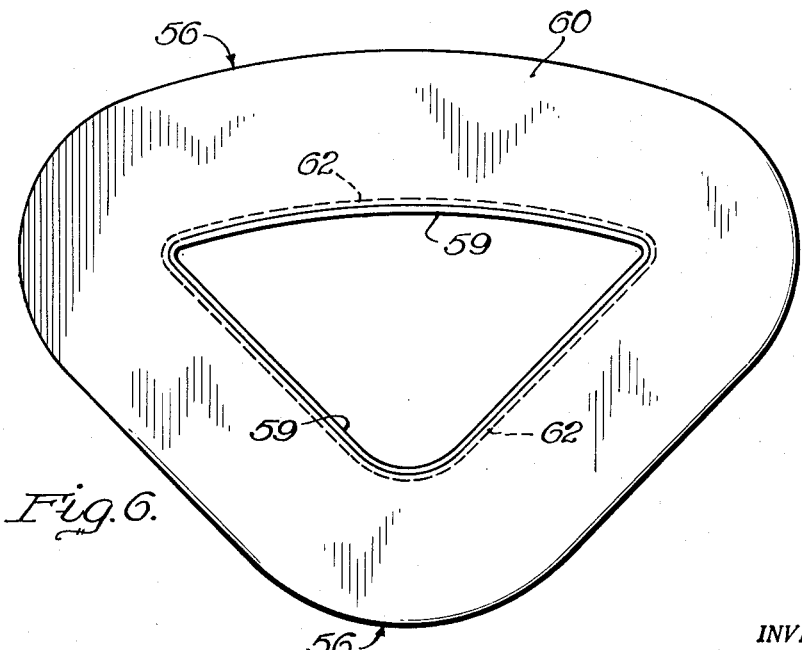
INVENTOR.
George H. Herrick
BY
Paul L. Kohler
Atty.

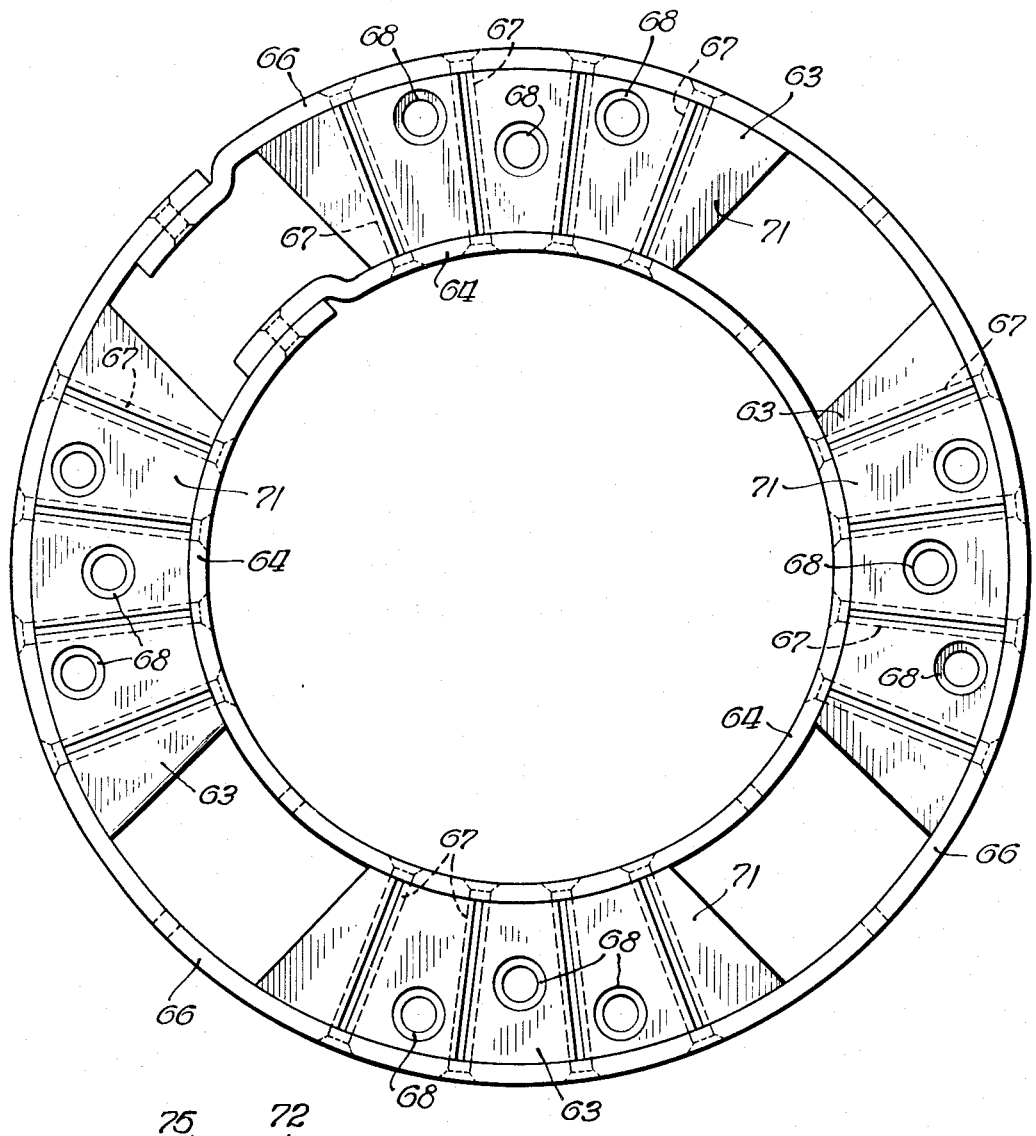
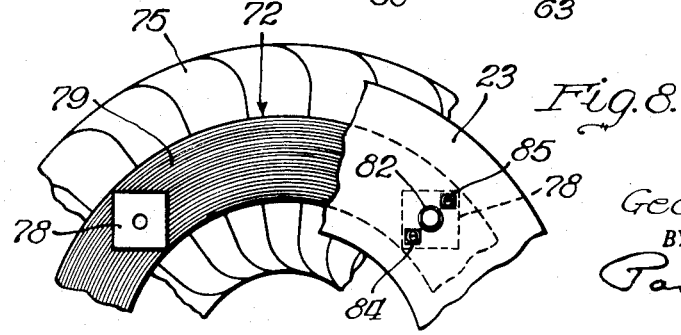

United States Patent Office 2,724,067
Patented Nov. 15, 1955

2,724,067

AXIAL AIR GAP GENERATOR

George H. Herrick, Beloit, Wis., assignor to Fairbanks, Morse & Co., Chicago, Ill., a corporation of Illinois Application August 20, 1951, Serial No. 242,646

4 Claims. (Cl. 310—268)

This invention relates to improvements in electrical machines, and has particular reference to certain novel and advantageous improvements in the form and construction of an electric generator or alternator of axial air gap type.

The present invention concerns a generator or alternator of axial air gap type, and affords improvements in the construction of the rotor assembly including the current collector ring structure thereof, and improvements in the stator assembly including a provision for close control of the extent of the air gap between the rotor and stator. The character of the improvements referred to, will become evident from a consideration of the following description and accompanying drawings relating to a presently preferred embodiment of the invention.

In the drawings:

Figures 5 and 6 are enlarged side and front views respectively, of the insulator spool for a coil winding associated with each of the salient poles of the rotor;

Figure 7 is a front elevational view of a pole tip assembly for the salient poles of the rotor;

Figure 8 is a fragmentary end view of the stator core and winding assembly, with the stator mounting plate shown in fragmentary part, illustrating core mounting elements and gap adjusting screws, and Figure 9 is a longitudinal sectional view of a collector ring assembly for operative association with the machine rotor assembly.

Figure 1:
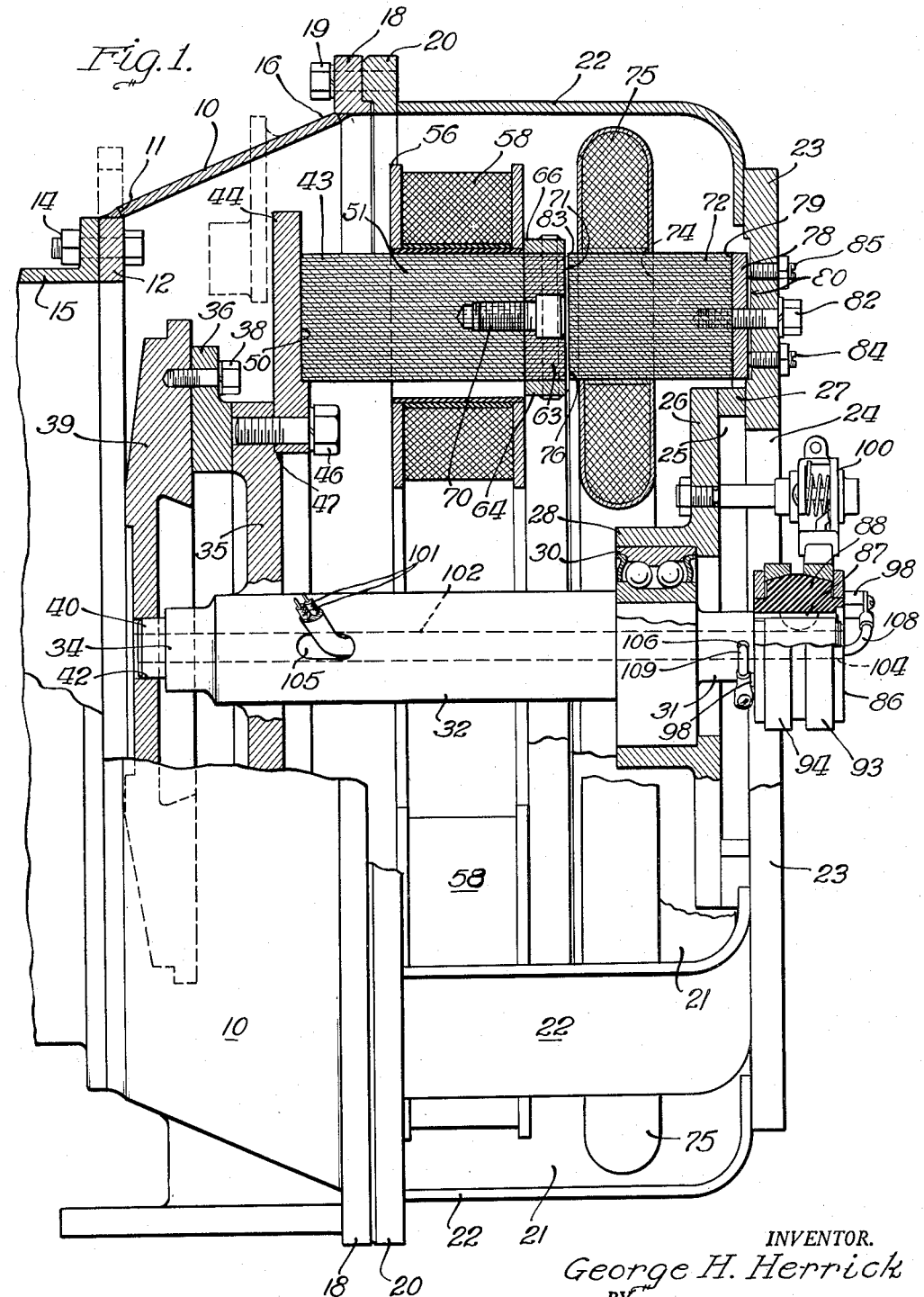
Figure 1 is a longitudinal view partly in section and partly in elevation, of an axial air gap generator embodying the present improvements.

Referring to the drawings, Fig. 1 illustrates partly in longitudinal section a generator or alternator embodying the present improvements. As there shown, the generator frame is adapted by preference, for direct connection to a frame part of the generator driving means which may be an internal combustion engine, electric motor or other prime mover. As illustrated, the generator frame preferably is of fabricated character, and includes an annular frame member 10 of frusto-conical form, having its margin 11 suitably welded to a mounting ring or flange member 12, the latter being adapted for direct securement as by bolts 14, to a frame part 15 of the generator driving engine. The frame part 15 may be a portion of the crankcase of the engine (not shown). The other margin 16 of generator frame part 10 is welded to a ring 18, and to the latter is suitably connected as by bolts 19, a frame ring 20. Welded to the ring 20 are a plurality of frame bars 22 projecting therefrom to connection with an annular frame plate 23. Inwardly of the generator frame and spanning the open central area 24 of plate 23, is a further frame member 26 which is secured to the inner margin of plate member 23 through a plurality of mounting and spacer blocks 27 welded to the members. The spacer blocks 27 are relatively spaced to provide openings 25 between the adjacent margins of the members 23 and 26, these openings serving with the openings 21 between the frame bars 22, to provide for ventilation of the generator interior. Frame member 26 is formed to provide a hub 28 for the support of a suitable anti-friction bearing 30, the latter in turn rotatably supporting one end portion 31 of the generator shaft 32.

In the present example, the operative support of shaft 32 in its opposite end portion 34, is made through connection thereof with the shaft (not shown) of the generator driving engine, rather than by a separate bearing at this shaft end. Secured to the shaft 32 is a rotor hub plate 35 providing drive attachment projections 36 for connection through bolts 38, with a drive disk 39 which is in supported and driven connection with the engine shaft (not shown). Centering of the generator shaft 32 with the drive disk 39 is afforded through seating of the generator shaft terminal end portion 40 in a center opening 42 of disk 39.

Figure 3:
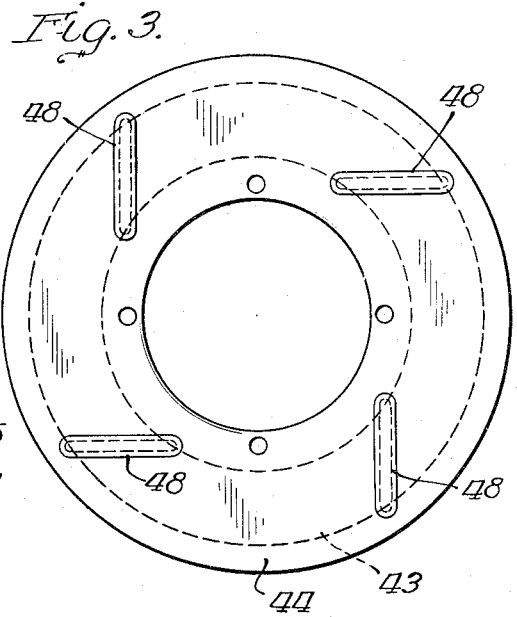
Figure 3 is a rear elevational view on a reduced scale, of the rotor core and mounting plate structure.

The rotor structure or rotating field assembly of the generator comprises a laminated core member 43 secured to a mounting plate 44, the latter being in supported connection with the rotor hub 35 through attachment bolts 46. By preference, plate 44 is disposed in a shouldered seat 47 of the hub plate 35, this to assure accurate coaxial centering of the annular core member 43 and the generator shaft 32. The manner of securement of core 43 to the plate 44 is shown in Fig. 3 wherein it appears that plate 44 is provided with a number of equally spaced, elongated slots 48 opening through the plate. These slots are so positioned as to underlie the rear face 50 of core member 43. In assembly of the core and plate, these slots are filled with suitable weld material which in fusion with the rear face of the core 43, serves to effect a positive, rigid connection of the core and plate 44.

Figure 2:
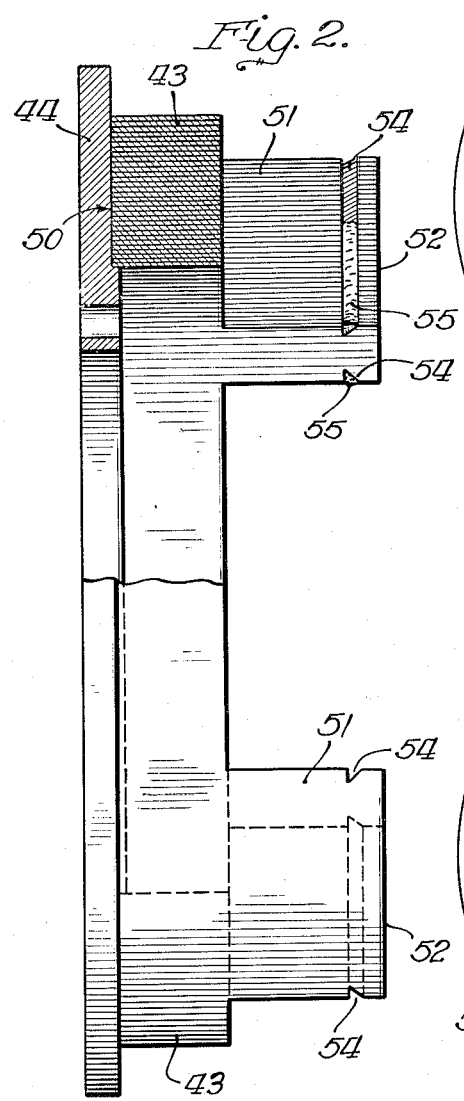
Figure 2 is a view in side elevation with parts in section, of the rotor plate and core member having salient poles as shown.
Figure 4:
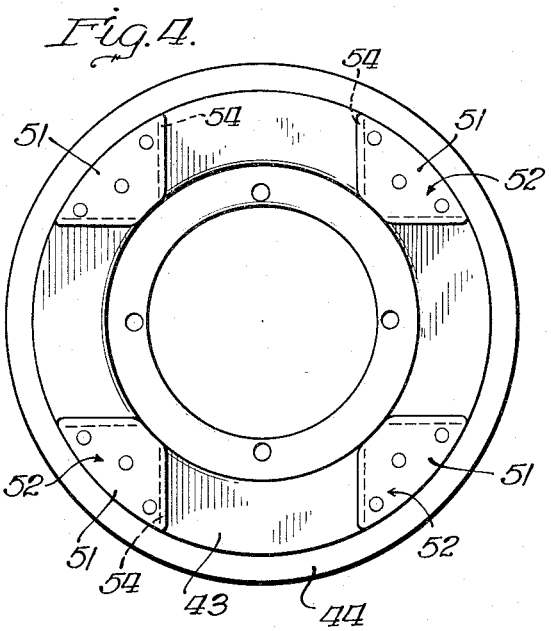
Figure 4 is a front view of the rotor plate and core member, shown in reduced scale.

With reference to Figs. 2 and 4 in particular, the laminated core member 43 is formed to provide a plurality of salient pole elements 51. In accordance with the present invention, these salient poles are provided as an integral part of the annular core 43. This may be accomplished by providing the annular core 43 to have an initial width in the axial direction of the core, equivalent to the distance between the rear face 50 of the core and the faces 52 of the salient poles. The core is then reduced as by metal cutting operations, such as to provide the annular portion 43 and the salient pole elements 51. In an initial stage of reducing the core to provide the poles 51, each pole element is undercut along opposite sides thereof as illustrated at 54, and before further cutting operations take place, such undercut areas are filled with welding material 55. In this manner the laminations in each salient pole are secured together against relative separation. As appears in Fig. 4, four salient poles 51 are thus provided, with each pole having a generally triangular form in frontal view.

Mounted on each of the salient poles 51 is a rotor field winding assembly comprising a coil spool 56 and coil winding 58 thereon. Figs. 5 and 6 show the form and construction of the coil spool 56. As there shown, the spool includes a base ring member 59 of generally triangular shape in side elevation, conforming to the form of the salient pole on which it seats. Engaged over each end of the base ring 59 is a coil side disk 60, and retaining the disks 60 in proper spaced relation is a sleeve member 62 surrounding the base ring 59 between the disks. All of the coil spool parts are formed of suitable rigid or self-supporting insulating material.

Each spool 56 having the coil winding 58 wound thereon, is slipped over one of the salient poles 51 and is displaced thereon until one of the side disks 60 abuts the adjacent face of the annular core portion 43. The several coil assemblies are retained in place on the salient poles through engagement thereof by portions of a pole tip structure now to be described.

Provided for each salient pole is a pole tip member 63 having the general frontal configuration as shown in Fig. 7. Each pole tip preferably is of laminated construction, with the laminations clamped together between inner and outer end rings 64 and 66 respectively. The end rings are common to all of the pole tip elements, and are secured to each of the pole tips by a plurality of through bolts or rivets such as illustrated at 67. Each pole tip is provided with suitably recessed openings 68 for the reception of mounting studs 70 (Fig. 1) provided for attaching the pole tip assembly to the several salient poles 51. As appears from Fig. 1, the pole tips 63 provide rotor pole faces 71 all disposed in a common plane which is normal to the axis of the generator shaft 32. Moreover, in the assembled connection of the pole tip structure to the salient poles 51, parts of the pole tips and end rings overlap the coil spool structures in abutment with the adjacent coil side disks 60, to retain the coil structure in place on the salient poles.

Referring again to Fig. 1, the generator stator comprises an annular core member 72 preferably of laminated construction and formed to provide radial slots 74 to receive the stator coil windings 75, these coils lying inwardly adjacent the planar pole face 76 of the stator core which is in spaced opposed relation to the rotor pole faces 71. A plurality of core mounting plate elements 78 are engaged against the rear face 79 of core 72 and firmly connected thereto as by welding. The plates 78 thus may be utilized through the weld connection to the core, to retain the laminations of the core in assembly position. Provided internally of the frame plate member 23 is a recessed core seat 80 to receive the core plates 78. Threaded through each core mounting plate 78 and into the underlying portion of the core 72, is a mounting stud 82 arranged through the plate 23, these studs serving to provide a supporting connection of the stator core assembly to the frame plate 23.

One particular feature of the present invention resides in the present provision for adjusting the extent of the air gap 83 between the pole faces of the rotor and stator core assemblies. The gap adjustment provision is found in a plurality of pairs of set screws 84 and 85 threaded through the plate 23 and arranged such that each pair is disposed for abutment with one of the stator core mounting plates 78, as in the manner illustrated in Figs. 1 and 8. Through these set screws in abutment with the core plates 78, it will appear that the position of the stator core assembly longitudinally of the machine, may be varied and controlled such as to determine or adjust the axial extent of the air gap 83.

Mounted on the end portion 31 of the generator shaft 32 is a current-collector ring assembly 86, the assembly being keyed to the shaft as at 87. Referring to Fig. 9 which shows the collector assembly in longitudinal section, the collector comprises a shaft mounting hub member 88 of insulating material and formed to provide oppositely beveled or tapered peripheral surface portions or seats 89 and 90, one adjacent each end of the hub. Moreover, each end of the hub is reduced below the adjacent peripheral seat, to provide an annular seat 92. An internally tapered collector ring 93 of conducting material, is mounted on the tapered hub surface 89, while a like collector ring 94 is engaged on the tapered seat 90 of the hub. Mounted on each hub seat 92 in abutment with the adjacent collector ring, is a retainer or clamping ring 96 of conducting material. The latter rings are secured to the hub through suitable screws 97 which when drawn up, effect through the clamping rings a firm wedge seating of the associated collector ring on the hub.

For circuit connection to the collector rings, each of the clamping rings 96 has secured thereto a terminal element 98. Suitable brush assemblies, only one brush assembly 100 being shown in Fig. 1, are provided in engagement with the collector rings 93 and 94.

The collector rings 93 and 94 are in circuit connection with the rotor coil windings 58 through a pair of conductors 101. To facilitate such connection, the generator shaft 32 is formed to provide a bore 102 extending longitudinally therein and open at 104 at the shaft end 31. Inwardly of the shaft end 34 is a shaft passage 105 communicating with shaft bore 102 and opening to the shaft periphery. A further shaft passage 106 communicating with the shaft bore 102, opens to the periphery of the shaft end portion 31 at a point adjacent the collector ring assembly. The conductors 101 extending from the coil windings 58, are directed through the passage 105 into the shaft bore 102 and longitudinally therein toward the shaft end 31. One of these conductors has its end 108 extended outwardly through the bore opening 104 and to connection with one terminal 98 of the collector ring assembly. The other conductor of the pair, has its end 109 projected outwardly through the shaft passage 106 and to connection to the other terminal 98 of the collector assembly.

From the foregoing it will appear now that the generator assembly as described, provides advantageous improvements in the rotor and stator structures, as well as in the collector ring assembly. Among improvements effected are the provision of a rotor core having integral salient poles with coil windings thereon, and a pole tip structure for the salient poles, which structure serves to retain the coil windings in place on the several poles; a stator mounting arrangement providing air gap adjustment provisions, and a novel and relatively simple collector ring assembly.

What I claim and desire to secure by Letters Patent is:

1. In an electrical machine of axial air gap type, a rotor structure providing a core having salient poles directed longitudinally of the machine and terminating in pole faces disposed in a common plane normal to the rotor axis, a stator structure including an annular, laminated core member having a planar side face in spaced opposed relation to the rotor pole faces to form an air gap therebetween, core mounting plates equally spaced about the stator core member in welded engagement with the opposite side face thereof, said plates in welded connection to the core member retaining the laminae thereof against relative separation, a machine frame assembly including a support member for the stator structure, and means carried by said support member and engaging said core mounting plates to retain the stator core structure on the support member.

2. In an electrical machine of axial air gap type, a machine frame assembly including a plate member adjacent an end of the frame, a rotor structure supported within the frame and providing a core having salient poles terminating in pole faces disposed in a common plane normal to the rotor axis, a stator structure within the frame and providing an annular, laminated core member having a planar side face in spaced opposed relation to the rotor pole faces to form an air gap therebetween, a plurality of plate elements equally spaced about the core member in welded engagement with the opposite side face thereof, said plate elements in welded connection to the core member retaining the core laminae thereof against relative separation, support means carried by said plate member of the frame assembly and threadedly engaging said core plate elements and the core member for supporting the stator structure in operative position relative to the rotor structure.

3. An electrical machine as defined in claim 2 characterized further by adjustable abutment means between said plate elements and said frame plate member, provided for effecting adjustments in the operative position of the stator structure relative to the rotor structure to determine the exent of said air gap.

4. A rotor structure for an electrical machine of the character disclosed, comprising an annular laminated core member providing laminated salient poles on one side of the member each terminating in an end face, the laminae of each salient pole being integral with the laminae of the core member, a weldment extending transversely of each pole inwardly adjacent its said end face, retaining the pole laminae against relative separation, a coil unit removably mounted on each pole in abutment with the core member, and a pole tip member removably secured in magnetic engagement with the end face of each pole, with portions of the pole tip member in abutment with the coil unit to retain the latter on the pole.

References Cited in the file of this patent

UNITED STATES PATENTS

| Number | Name | Date |
|---|---|---|
| 241,053 | Muller | May 3, 1881 |
| 249,716 | Wirsching | Nov. 15, 1881 |
| 264,228 | Beardslee | Sept. 12, 1882 |
| 284,292 | Gordon | Sept. 4, 1883 |
| 323,975 | Thomson | Aug. 11, 1885 |
| 581,089 | Southworth | Apr. 20, 1897 |
| 905,814 | Green | Dec. 1, 1908 |
| 1,438,361 | Coleman | Dec. 12, 1922 |
| 1,929,787 | Mudge | Oct. 10, 1933 |
| 2,322,011 | French | June 15, 1943 |
| 2,356,972 | Chubbuck | Aug. 29, 1944 |
| 2,438,629 | Anderson | Mar. 30, 1948 |
| 2,551,030 | Madden | May 11, 1951 |

FOREIGN PATENTS

| Number | Country | Date |
|---|---|---|
| 558,672 | France | May 30, 1923 |
| 186,057 | Germany | May 6, 1907 |
| 25,421 | Sweden | Aug. 9, 1904 |